May 14, 1963  C. HERFURTH  3,089,572
MACHINE TOOL DRIVE SYSTEM CONTROL MECHANISM
Filed June 7, 1961  3 Sheets-Sheet 1

INVENTOR.
CHARLES HERFURTH
BY
ATTORNEYS

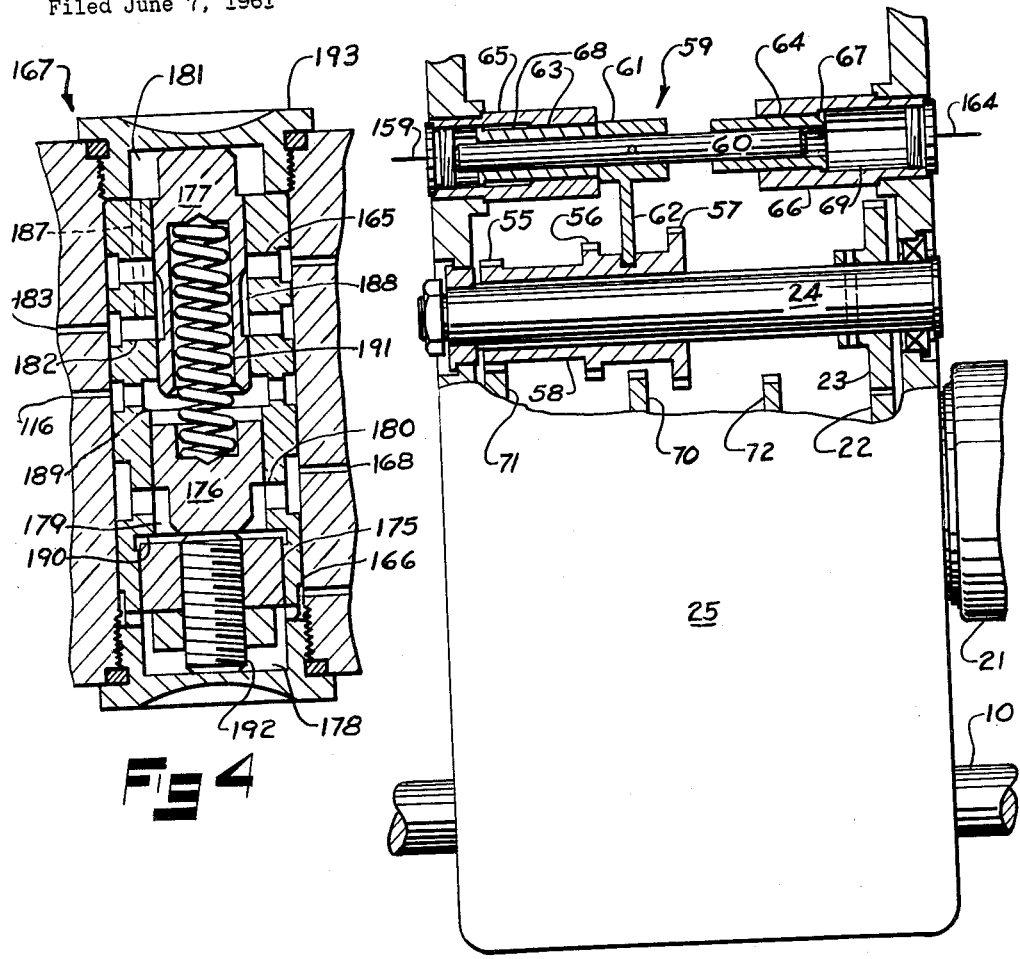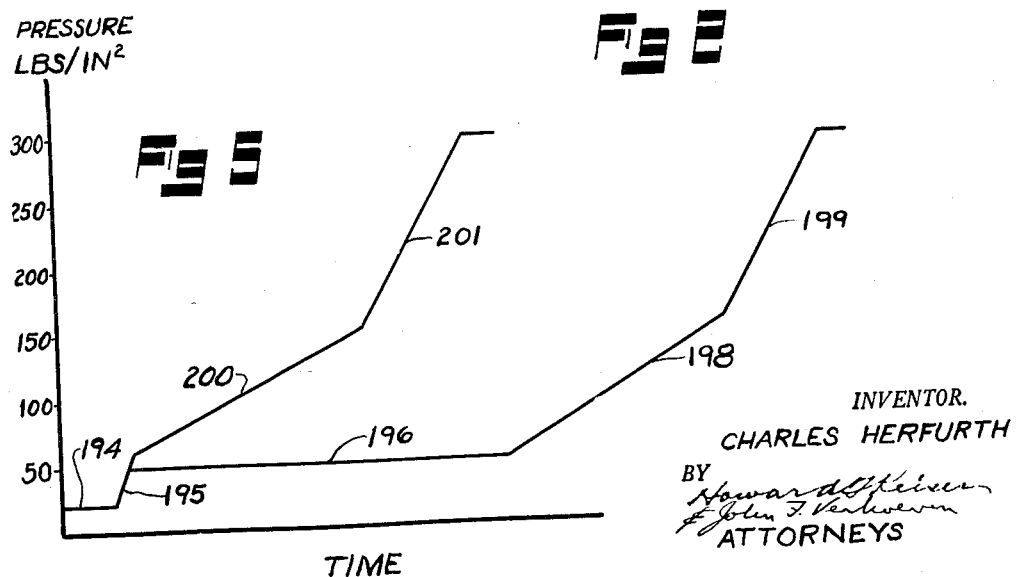

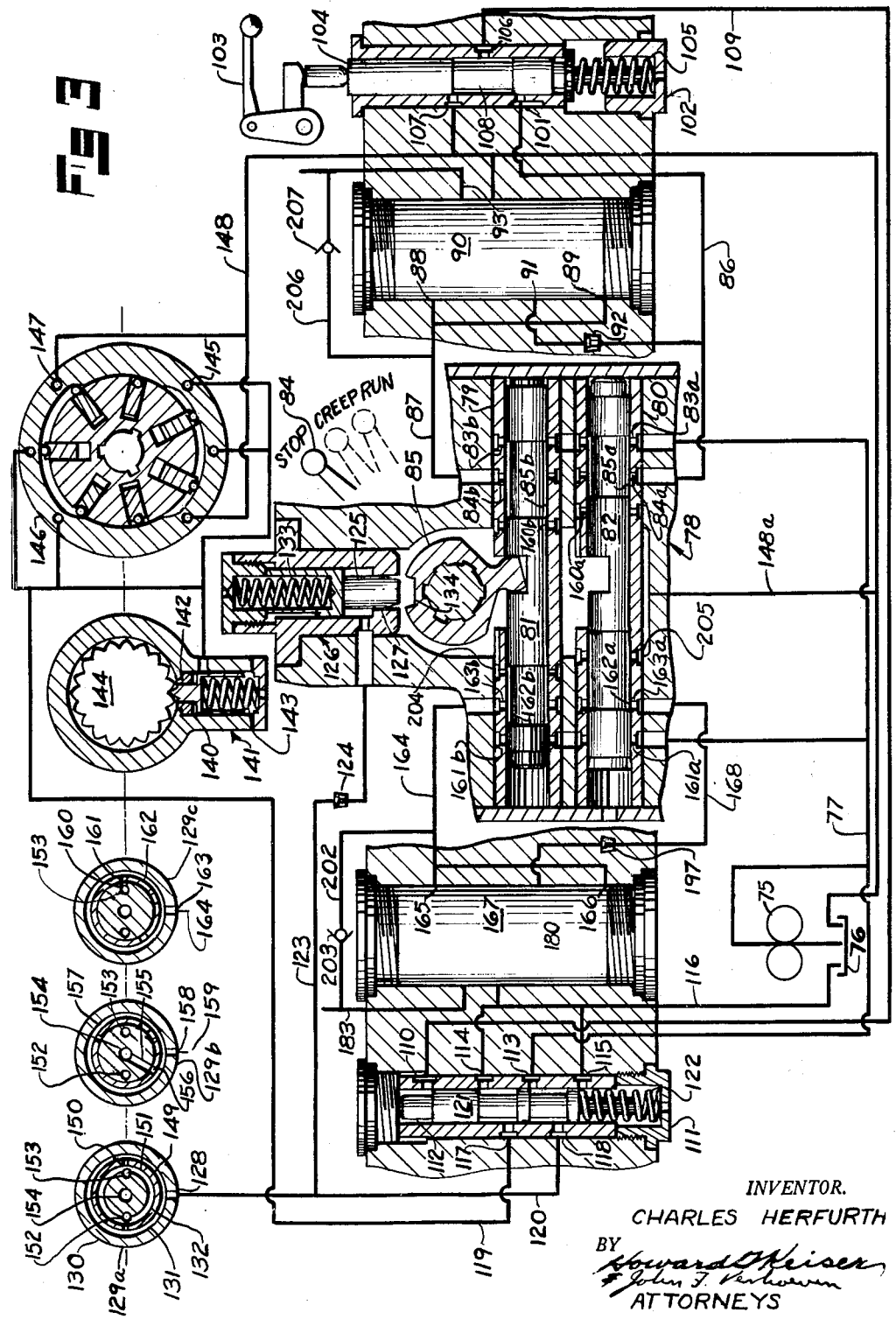

3,089,572
Patented May 14, 1963

1

3,089,572
MACHINE TOOL DRIVE SYSTEM CONTROL
MECHANISM
Charles Herfurth, Cincinnati, Ohio, assignor to The Cincinnati Milling Machine Co., Cincinnati, Ohio, a corporation of Ohio
Filed June 7, 1961, Ser. No. 115,530
8 Claims. (Cl. 192—3.5)

The present invention relates to a machine tool drive mechanism and more particularly to mechanism to control the operation of the clutch thereof.

A typical drive to run a machine tool member, such as the tool carrying spindle in a milling machine, includes a transmission to drive the spindle at selected speeds and a motor, or prime mover, connected to the input end of the transmission through a clutch. One type of clutch commonly used in machine tool drive systems has a fluid chamber, and the clutch, in response to fluid under pressure received in the chamber, effects engagement between a driving member, which may be a shaft connected to the motor, and a driven member, which may be a shaft connected to the input end of the transmission. Frequently the clutch mechanism is incorporated with a brake mechanism which operates to connect the driven member, such as the shaft connected to the input end of the transmission, to a stationary member to stop the spindle.

It is desirable to start the spindle as quickly as possible without the jerking or shock which would result from the sudden full engagement of the clutch. It has been found that a quick, smooth start can be effected by a clutch operation in which initially fluid flows freely to the clutch chamber until pressure starts to build up therein, at which time the flow is throttled to establish a reduced pressure in the clutch chamber so that a slipping engagement between the drive shaft and the driven shaft is effected. As the transmission members and spindle, which are not under load, start to rotate as a result of the slipping engagement, pressure is increased in the clutch chamber, preferably at a controlled rate, until a gripping engagement is effected by the clutch. Thereafter additional pressure, to prevent clutch slippage at full load, may be applied to the clutch chamber without affecting the smoothness of the spindle start.

If the gears of the transmisison are already in mesh, the spindle can be started smoothly and quickly with this operation. However, if the gears of the transmission have just been shifted and were unable to mesh because of the angular position of the gears, this clutch operation, if effected quickly, will accelerate the gears of the transmission too rapidly to permit a quiet meshing of the gears. In many machine tool drive systems a mechanism is provided to turn the input shaft of the transmission at a reduced speed after the gears of the transmission have been shifted so that all the gears can mesh smoothly before the input shaft is turned at an operating speed. This creep mechanism may, for example, be selectively connectable between the clutch and the input shaft of the transmission.

In the present invention mechanism is provided to establish a reduced pressure in the fluid chamber of the clutch which will cause the input shaft of the transmission to turn at a creep speed and to maintain that pressure in the clutch chamber until the gears of the transmission are fully meshed. The clutch operation which has been found to effect a quick, smooth engagement between a drive shaft and a driven shaft can be most efficiently performed automatically and, in the preferred form of the present invention, the mechanism which performs this clutch operation is selectively utilized, after there has been a shifting of the transmission gears, to provide a creep speed to the transmission input shaft for quiet meshing of the gears. Although the application of fluid to the clutch chamber for a quick, smooth spindle start is effected automatically when a normal spindle start is selected by the operator, the operator, with the mechanism of the present invention, can alternately select to hold the pressure in the clutch chamber at a reduced level. The reduced pressure level in the clutch chamber effects a slipping engagement between the prime mover and the transmission which can be maintained to drive the input shaft of the transmission at a reduced, or creep, speed for any required length of time until all the gears are fully engaged.

It is therefore one object of the present invention to provide mechanism operable to apply pressure to the fluid chamber of a machine tool clutch to effect a quick acceleration of a machine tool member to full speed and operable alternately to apply a reduced pressure to said fluid chamber for gear shifting.

It is another object of the present invention to provide mechanism operable automatically sequentially to pass fluid freely to the fluid chamber of a machine tool clutch, to throttle the flow of fluid thereto as pressure builds up in the clutch chamber to control the pressure therein, and thereafter either to apply full pressure to the clutch chamber if a quick smooth start of the member driven by the clutch is desired, or, alternately, to hold the reduced pressure in the fluid clutch chamber if gear meshing is required.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 2 shows the spindle transmission which is driven through the clutch-brake mechanism of FIG. 1;

FIG. 3 is a schematic diagram of the hydraulic system of the drive mechanism incorporating the present invention;

FIG. 4 is an enlarged view of the clutch chamber pressure regulating valve; and

FIG. 5 is a chart indicating the time-pressure relationship in the clutch chamber for a normal spindle start, and for a spindle start after the gears of the transmission have been shifted.

Figure 1:
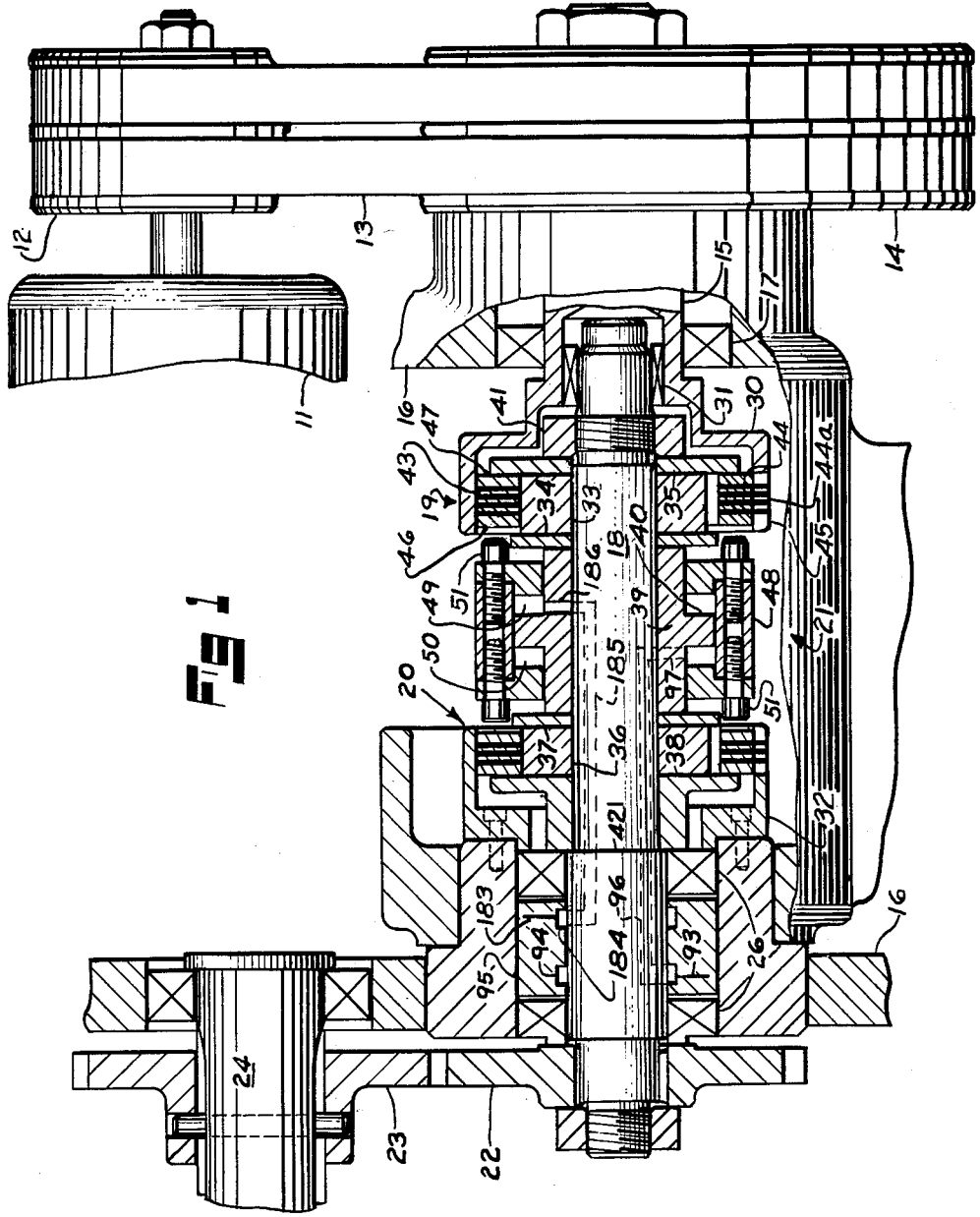
FIG. 1 shows the prime mover and clutch-brake mechanism of a drive mechanism incorporating the present invention.

There is shown in the drawings a drive system for turning a spindle 10 (FIG. 2) which may, for example, be the tool carrying spindle of a milling machine. A motor 11 (FIG. 1) drives a pulley 12 which is connected by belts 13 to a pulley 14. The pulley 14 is secured to a shaft 15 (which may be considered a drive shaft) rotatably mounted in a stationary support 16 by bearings 17. The drive shaft 15 is engagable with a rotatable shaft 18 (which may be considered a driven shaft) through a clutch, indicated generally at 19. The driven shaft 18, which is aligned with drive shaft 15, has one end rotatably received in bearing 31 of the drive shaft and the other end rotatably carried by bearings 26 of support member 16. The shaft 18, when disengaged from drive shaft 15, can be braked by engagement with the stationary member 16 through a brake, indicated generally at 20. The brake and clutch devices are connected to operate as a coordinated unit, indicated generally at 21, so that when one device is engaged, the other is disengaged. The shaft 18 has a gear 22 secured thereto which is engaged with a gear 23 secured to the input shaft 24 of a transmission, indicated generally at 25 (FIG. 2). The spindle 10 is driven at a selected speed through shiftable gears in the transmission when the driven shaft 18 is engaged through clutch 19 with drive shaft 15.

The clutch 19 has a cup-shaped member 30 integral with drive shaft 15, and brake 20 has a similarly shaped member 32 secured to the stationary support 16. A clutch hub 33 is received on shaft 18 between front and rear plates 34 and 35, respectively, and a similar brake hub 36 is received on shaft 18 between front and rear plates 37 and 38, respectively. A sleeve 39, having a flange 40, is received on shaft 18 between the clutch and brake. The clutch and brake rear plates 35, 38, and all the members (33, 34, 39, 37, 36) received on shaft 18 therebetween, are splined on shaft 18 and tightly secured thereon by a nut 41 engaging rear plate 35 to hold rear plate 38 tightly against shoulder 42 on shaft 18. A plurality of clutch plates 43 and 44 are alternately and loosely received between rings 46 and 47 on each of the hubs 33 and 36, within members 30 and 32, respectively. Each clutch plate 44 has ears 44a received in circumferentially spaced slots 45 in the cup shaped member. The rings 46, 47, and each clutch plate 43 are splined to the hubs 33, 36, and when pressure is applied to one of the front rings 46, the annular rings and clutch plates are squeezed against rear plate 35 or 38. Since the clutch plates 44 are nonrotatable relative to the cup-shaped members 30, 32 and the clutch plates 43 are nonrotatable relative to the shaft 18, engagement is established between the shaft 18 and one or the other of members 30, 32 when pressure is applied to one of the front rings 46. The application of pressure to the rings 46 is effected by a cylinder 48 which is slidably received on sleeve 39 and over flange 40. Flange 40 defines a stationary piston for the slidable cylinder and, with the cylinder, defines two annular fluid chambers 49 and 50. The cylinder has oppositely extending studs 51 which, when pressure is applied to one or the other of chambers 49, 50 to move the cylinder toward the clutch or brake, engage the front ring 46 to operate, or actuate, the clutch or brake.

The transmission 25 (FIG. 2) includes some shiftable gears, such as the gears 55, 56, 57 integral with a hub 58 which is keyed to input shaft 24 for axial movement thereon. The hub 58 is shifted axially on shaft 24 by a hydraulic shifter 59 to establish, through one of the gears 55, 56, 57, a selected gear train to rotate spindle 10 at a selected speed. The shifter 59 has a rod 60 pinned to a hub 61 and the hub has an arm 62 engaged with gear hub 58. The ends of the rod 60 are received in sleeves 63, 64 slidably received in cylinders 65, 66 of the transmission. Each sleeve has a flange 67 at its outer end, which flanges are received, respectively, in chambers 68 and 69 of the cylinders. When pressure is simultaneously applied at the outer end of both chambers 68, 69, both sleeves 63, 64 are urged toward their inner positions, thereby urging hub 61 and rod 60 toward a central position. This shifts gear 56 toward gear 70 in the transmission and, if the teeth of gear 56 are angularly positioned to slip between the teeth of gear 70, the gears will mesh. If the teeth of gear 56 are not so positioned the teeth can not mesh and one of the gears, such as 56, will have to be rotated slowly relative to gear 70 while pressure is maintained in chamber 68. When the teeth of the slowly rotated gear are in proper angular position to mesh, the sleeve 63, which could not move to its extreme inner position while the teeth of the gears were in side-to-side contact, slips into its extreme inner position to bring the gears into meshing engagement. If chamber 69 is connected to pressure and chamber 68 to exhaust, the shifter hub 61, and gear hub 58, will be moved to their extreme left hand positions (as viewed in FIG. 2) for engagement of gear 55 with gear 71. Conversely, connection of chamber 68 to pressure and chamber 69 to exhaust will shift the hubs 61 and 58 to their extreme right hand positions for engagement of gears 57 and 72.

There is shown in FIG. 3 a pump mechanism 75 which takes fluid from sump 76 and supplies fluid under pressure to pressure line 77. A control valve, indicated generally at 78, comprises two sections 79, 80 each having a plunger 81, 82 respectively, said plungers being mechanically connected together (by means not shown) for movement in unison by a link 85 which is rotated by handle 84. When handle 84 is in the stop position, the valve plungers 81, 82 are in the positions shown, and fluid under pressure is transmitted from the right hand pressure port 83a of section 80, which port is connected to pressure line 77, to port 84a of that section through annular passage 85a defined by valve plunger 82. Pressure port 83a is continuously connected to pressure port 83b of valve section 79 through annular grooves at the ports and an interconnecting passage through the valve body. Port 83b is connected through annular passage 85b (defined by valve plunger 81) to port 84b of that section when the valve plungers are in the stop position. Thus pressure is supplied to lines 86 and 87, and through line 87 to the ports 88 and 89 of brake pressure regulating valve 90. Port 91 of valve 90 is connected to line 86 through an adjustable restriction 92. Valve 90 operates, as will be described more fully subsequently, to ultimately supply fluid under full pressure to line 93 which, as shown in FIG. 1, is connected to an annular groove 94 in the distributor block 95 secured in stationary support 16, and through passage 96 in shaft 18 to passage 97 communicating with annular brake chamber 50. Pressure in chamber 50 shifts cylinder 48 to the left to engage shaft 18 with stationary brake member 32 to stop shaft 18 and spindle 10.

When the transmission members are at rest, after operation of brake 20, the gears thereof may be shifted to effect a change of operating speed of spindle 10. Line 86 is connected to port 101 of speed change control valve 102 and, when control handle 103 is pulled to the right, valve plunger 104 is depressed against spring 105 to disconnect port 106 from discharge port 107, and connect port 106 to port 101 through the annular passage 108 defined by valve plunger 104. Port 106 is connected to line 109 which is connected to port 110 of valve 111, said port being in communication with chamber 112 in the valve. In addition to the port 110, valve 111 has a pressure port 113 connected to pressure line 77, two discharge ports 114 and 115 connected to return line 116, and two motor ports 117 and 118 connected, respectively, to lines 119 and 120. Before pressure is received in chamber 112 and while valve plunger 121 of valve 111 is held in the position shown by spring 122, port 118, and hence line 120, is connected to port 113 and pressure, while port 117, and hence line 119, is connected to port 114 and exhaust. With line 120 connected to pressure, pressure is applied through line 123, containing restriction 124, to chamber 125 of locking member 126 to hold locking plunger 127 disengaged from link 85. At the same time, pressure is supplied through line 120 to operating port 128 of a speed selector valve 129 having a casing 130, a sleeve 131 fixed in the casing, and a core 132 rotatable in the sleeve. When pressure is received in chamber 112 of valve 111 and the plunger 121 thereof is depressed, port 113, and hence line 119, is connected to port 117 and pressure, and port 118, and hence line 120, is connected to port 115 and exhaust. With line 120, and hence line 123, connected to exhaust, pressure is disconnected from operating port 128 of speed selector valve 129, and from chamber 125 of locking member 126 so that spring 133 urges locking plunger 127 into notch 134 of link 85 to prevent inadvertent operation of control valve 78. With line 119 connected to pressure, pressure is applied to chamber 140 of detent 141 to depress plunger 142, against spring 143, and release serrated wheel 144, which is connected to core 132 of the speed selector valve, for rotation. At the same time pressure is applied to pressure ports 145 of rotary hydraulic motor 146, the exhaust ports 147 of which are connected to return line 148. The hydraulic motor 146 is connected to, and rotates, core 132 of the speed selector valve, and after the core 132 is rotated to the desired angular position (depending on desired spindle speed) the control handle 103 is released. This permits valve member 104 to return to the position shown to disconnect port 106 from pressure, and connect the port 106 to exhaust through port 107 and return line 148. This relieves the pressure from line 109 and chamber 112, permitting valve plunger 121 to return to the position shown to reapply pressure to line 120 and relieve pressure from line 119 to stop motor 146 and hold the core 132, by detent plunger 142, in the angular position selected.

The rotary speed selector valve has a plurality of axially spaced sections for control of a plurality of hydraulic shifters in the transmission. Only the sections which determine operation of the single hydraulic shifter 59 shown in FIG. 2 are shown in the hydraulic diagram of FIG. 3. When pressure is applied to operating port 128, it is transmitted, at section 129a of the speed selector valve, through the external groove 149 of sleeve 131 and through passage 150 in sleeve 131 to an external groove 151 in the rotatable core 132. Groove 151 is in communication with two axially extending pressure passages 152, 153 in the core 132. The core 132 also has an axially extending passage 154 permanently connected to exhaust by a return line (not shown). At section 129b, discharge passage 154 is connected through passage 155 in the core and passage 156 in the sleeve to annular external sleeve groove 157 at that section, which is in communication with a port 158. Port 158 is connected, by line 159, to the outer end of chamber 68 (FIG. 2) of cylinder 65 of the hydraulic shifter 59. At section 129c pressure line 153 is connected through passage 160 of the sleeve to external sleeve groove 162 and passage 161 at that section, which is in communication with port 163. Port 163 is connected by line 164 to the outer end of chamber 69 of cylinder 66 of shifter mechanism 59. With these pressure conditions at the shifter mechanism, the gear hub 58 is urged to the left and, if gears 55 and 71 are not in the proper relative angular relationship for meshing, gear 55 will be urged against the side of gear 71.

When pressure is restored to line 120, and hence line 123, locking plunger 127 is raised and disengaged from link 85 so the control valve can be shifted by handle 84 to a creep position where the valve members 81 and 82 are in an intermediate position. With valve members 81 and 82 in the intermediate position, pressure ports 83a and 83b are blocked, and ports 84a, 84b are connected to exhaust through ports 160a, 160b, the body of the valve, and line 148a which is connected to return line 148. With ports 84a, 84b connected to exhaust, ports 88, 89, and 91 of valve 90, and port 101 of valve 102, are connected to exhaust. The brake chamber 50 is, at this time, connected to exhaust since the brake chamber line 93 is connected, around valve 90, to port 84b by line 206 containing check valve 207.

When the valve members 81 and 82 were in the stop position, as shown in FIG. 3, port 161a which is connected to pressure line 77, and port 161b which is continuously connected to port 161a through the external annular grooves encircling the valve sleeves at the ports and the interconnecting passage between the grooves, were both blocked. When the valve members are shifted to their intermediate, or creep, position, port 161a remains blocked but port 161b is connected through annular passage 162b (defined by valve plunger 81) to port 163b. Thus pressure is applied through port 163b to line 164 connected thereto, and through that line to ports 165 and 166 of clutch pressure regulating valve 167, but no pressure is applied, at this time, to port 163a or line 168 connected thereto.

The valve 167 is shown in more detail in FIG. 4 and the brake pressure regulating valve 90 is of similar construction. The valve has three separable axially movable valve members: an adjusting member 175, an operating member 176, and a pressure regulating member 177. Beneath the adjusting member 175 is a chamber 178 in communication with port 166; between the adjusting member 175 and operating member 176 is an operating chamber 179 in communication with a port 180 to which line 168 is connected; between the operating member 176 and pressure regulating member 177 is a chamber 189 connected to return line 116; and above the pressure regulating member 177 is a pressure regulating chamber 181. Below port 165 is a port 182 to which line 183 is connected. Line 183 is connected to annular groove 184 in block 95 (FIG. 1), said groove communicating with a passage 185 which extends through shaft 18 and connects by passage 186 to annular clutch chamber 49. The port 182, which defines the outlet port of valve 167, is connected by passage 187 to the pressure regulating chamber 181 and, when the pressure regulating member 177 is in the position shown, port 182 is connected to port 165 through annular passage 188 on pressure regulating member 177 so that fluid can flow freely from port 165, which defines the inlet port of the valve, to the outlet port 182.

When pressure is applied to chamber 178 through port 166, adjusting member 175 is raised to abut against shoulder 190, and spring 191, interposed between operating member 176 and pressure regulating member 177, is under a predetermined compression depending upon the amount adjustable screw 192, which is adapted to engage operating member 176, extends upwardly from the surface of member 175 which engages shoulder 190. Normally, pressure regulating member 177 abuts against cap 193 and fluid initially flows freely through the valve (from inlet port 165 to outlet port 182) and to clutch chamber 49 through the clutch chamber line 183. Thus cylinder 48 (FIG. 1) quickly shifts to the right until contact is made with front clutch ring 46. The pressure in chamber 49 will remain low, as indicated at 194 in FIG. 5, until this contact is made since little resistance is encountered. When studs 51 engage ring 46, however, the pressure will begin to rise quickly, as indicated at 195 in FIG. 5. This rising pressure is communicated back through line 183, port 182, and passage 187 to the pressure regulating chamber 181 and, at some relatively low predetermined valve, will lower pressure regulating valve member 177 from its free flow, or normal, position shown to a throttle position to throttle flow entering the valve at port 165. As in a conventional pressure regulating valve, the spring biased pressure regulating valve member 177 holds the pressure at port 182, and in clutch chamber 49 and pressure regulating chamber 181, at the relatively low predetermined value, say 50 pounds per square inch, determined by spring 191. Since pressure is applied to chamber 178 at this time, the pressure established in the clutch chamber by the member 177 at this stage of the operation is selected by the adjustment of screw 192. While the pressure in clutch chamber 49 is held at some relatively low value, such as 50 p.s.i., as indicated at 196 in FIG. 5, the clutch will effect a slipping engagement between drive shaft 15 and driven shaft 18, so that shaft 18, and hence the transmission shafts connected thereto, will turn slowly, at creep speed, giving the gears, such as gears 55 and 71, a chance to mesh.

After all the gears of the transmission are properly meshed, valve members 81 and 82 are shifted to their extreme left hand, or run, position by handle 84, and this connects port 163a to pressure port 161a through annular channel 162a while port 163b remains connected to port 161b and pressure. Fluid thus passes at a controlled rate through line 168, because of the adjustable restriction 197 therein, and through port 180 (which defines the operating port of the valve) into operating chamber 179. The controlled flow of fluid to operating chamber 179 gradually raises operating member 176 at a controlled rate to constitute, in effect, a continuous adjustment of the pressure regulating valve defined by spring 191, pressure regulating member 177, ports 165 and 182, and pressure regulating chamber 181. This adjustment gradually raises the pressure in clutch chamber 49 because under the action of operating member 176, valve member 177 gradually rises and port 165 gradually opens, despite the rising pressure in chamber 181 which is in communication with the clutch chamber. This gradual rise in pressure in the clutch chamber, indicated at 198 in FIG. 5, prevents the clutch from grabbing suddenly. Although the rise of the pressure regulating member 177 (and the rise in pressure in clutch chamber 49) is described as gradual since it occurs at a controlled rate determined by the setting of adjustable restriction 197, it should be noted that restriction 197 is preferably set so that valve member 177 will be moved (and pressure in the clutch chamber 49 will be increased) at a rate as rapid as possible consistent with smooth acceleration of the spindle and transmission members. The operating member 176 may contact pressure regulating member 177 after sufficient pressure has built up in the clutch chamber to eliminate slip at no load, and since the operating member 176 has a larger area exposed to chamber 179 than the area of member 177 exposed to chamber 181, the operating member 177 will be returned to its initial normal, or free flow, position. After member 176 engages member 177 to render the spring 191 ineffective, the pressure in clutch chamber 49 will increase more rapidly, as indicated at 199, to the full pressure in line 164, say 300 pounds per square inch, a pressure sufficient to hold the shaft 18 fully engaged, without slipping, to shaft 15 at full load.

It should be noted that on many occasions it will be desirable, when the spindle is stopped and the gears are already in a shifted position to produce a desired spindle speed, to get the spindle 10 up to full running speed as quickly as possible. In this situation the control handle 84 is immediately shifted from the stop to run position without pause in the creep position. As before, there is a relatively free flow of fluid through the clutch pressure regulating valve to the clutch chamber 49 until resistance therein is met, at which time pressure in the clutch chamber rises sharply until the pressure in pressure regulating chamber 181, which is in communication with the clutch chamber, causes pressure regulating valve member 177 to throttle the flow to the clutch chamber. Operating port 180 was connected to fluid under pressure, through restriction 197, when the control valve was shifted to the run position so that operating member 176 continuously rises. Thus, when pressure is encountered in clutch chamber 49, the pressure therein initially rises to a value, say 60 pounds per square inch, determined by spring 191 and the position, at that time, of operating member 176. This pressure in the clutch chamber, which effects only a slipping engagement between the drive shaft and driven shaft and begins a slow movement of the transmission members connected to driven shaft 18, does not remain constant but continuously rises (since operating member 176 continuously rises), as at 200 in FIG. 5, to continuously reduce the slip in the clutch and to continuously accelerate the members driven by the clutch. When the spindle driven through the clutch (which it is assumed is not under load) is up to operating speed, or nearly up to operating speed, the pressure can be applied more quickly to the clutch chamber, as indicated at 201, without causing the clutch to grab. This will occur if the operating member 176 contacts the pressure regulating member 177, as previously described, to negate the pressure regulating effect of spring 191, and cause the member 177 to return to its normal, initial position against cap 193 in accordance with the force differential established across both members 176 and 177 by the pressure in chamber 179 and the pressure in chamber 181.

It will be noted that whenever the handle 84 is shifted to the stop position, fluid under full pressure is applied to ports 88 and 89 of the brake pressure regulating valve 90, and fluid is supplied through restriction 92 to port 91 thereof. The brake pressure regulating valve 90 is preferably constructed similarly to clutch pressure regulating valve 167 with ports 88 and 89 corresponding, respectively, to ports 165 and 166; with port 91 corresponding to port 180; and with the port to which line 93 is connected corresponding to the port 182 to which the line 183 is connected. If the brake chamber pressure regulating valve 90 is so constructed, a free flow of fluid will initially be supplied to the brake chamber until pressure starts to build up therein. When the pressure builds up to a relatively low predetermined value, the flow through the valve will be throttled to prevent a sudden build up in pressure which would cause the brake to grip. Instead, as in the clutch, there will be a gradual build up in pressure until the spindle is stopped, and then there may be a more rapid increase of pressure.

When the control valve plungers 81 and 82 are in the right hand, or stop, position, as shown in FIG. 3, for application of fluid under pressure to the brake chamber 50, the clutch chamber 49 is connected to the sump through passage 186, 185, groove 184, line 183, the line 202 containing check valve 203 and connected around the valve 167, line 164, annular passage 162b on plunger 81, port 204 connected to the chamber defined by the valve body, and lines 148a and 148. At the same time the inlet port 165 and port 166 of the clutch chamber pressure regulating valve 167 are connected to the sump through line 164, and operating port 180 is connected to the sump through line 168, port 163a, discharge port 205 connected to line 148a through the valve body, and lines 148a and 148. When the control valve plungers 81 and 82 are in the left hand, or run, position for application of fluid under pressure to the clutch chamber 49, the brake chamber 50 is connected to the sump through passages 97 and 96, groove 94, line 93, line 206 containing check valve 207, line 87, annular passage 85b, port 160b, and through the valve body to lines 148a and 148. At the same time, ports 88 and 89 of the brake chamber pressure regulating valve 90 are connected to discharge through line 87, and operating port 91 is connected to discharge through line 86, port 84a, annular passage 85a, and port 160a which is connected through the valve body to line 148a and to return line 148.

What is claimed is:

1. In a machine tool having a drive mechanism including a transmission, the combination comprising a clutch in said drive mechanism having a clutch chamber, said clutch actuated in response to fluid received in the clutch chamber, a source of fluid under pressure, a hydraulic valve selectively connectable between the source of fluid under pressure and the clutch chamber, said valve having a valve member normally held in a predetermined position to pass fluid freely from the source of fluid under pressure to the clutch chamber when the valve is connected therebetween, said valve member shiftable in one direction from said predetermined position in response to pressure in the clutch chamber to throttle the fluid flow thereto and limit the pressure therein, means operable after the valve is connected to the source of fluid under pressure to shift said valve member reversely back to its normal position at a controlled rate for application of full pressure to the clutch chamber after a predetermined time, and means selectively to disable said means for reversely shifting said valve member to hold the pressure in the clutch chamber at a reduced level while the gears of the transmission are being shifted.

2. In a machine tool having a drive mechanism, the combination comprising a clutch in said drive mechanism having a clutch chamber, said clutch actuated in response to fluid received in the clutch chamber, a source of fluid under pressure, a sump, a valve having an inlet port selectively connectable to the source of fluid under pressure and an outlet port connected to the clutch chamber, said valve having an operating chamber and a valve member normally held in a free flow position to pass fluid freely from the inlet port to the outlet port when the inlet port is connected to the source of fluid under pressure, said valve member shiftable in one direction from the free flow position to a throttle position in response to pressure in the clutch chamber to throttle the flow of fluid from the inlet port to the outlet port and limit the pressure in the clutch chamber, said valve member shiftable in the opposite direction toward the free flow position in response to a change of pressure in the operating chamber, and a control valve in communication with the source of fluid under pressure and the sump operable in one position to effect a gradual change in pressure in the operating chamber when the inlet port is connected to the source of fluid under pressure and operable in another position to hold the pressure in the operating chamber constant when the inlet port is connected to the source of fluid under pressure.

3. In a machine tool having a spindle drive mechanism including a transmission, the combination comprising a clutch in said drive mechanism having a clutch chamber, said clutch actuated in response to fluid received in the clutch chamber, a source of fluid under pressure, a valve hydraulically connectable between the source of fluid under pressure and the clutch chamber, said valve having a first chamber hydraulically connected to the clutch chamber and a second chamber having a restricted passage leading thereto, said valve having a valve member normally held in a position to pass fluid freely from the source of fluid under pressure to the clutch chamber when the valve is connected to the source of fluid under pressure, said valve member shiftable in one direction from said normal position in response to pressure in said first chamber to throttle the fluid flow to said clutch chamber and limit the pressure therein, said valve member shiftable in the opposite direction when fluid under pressure is connected to said restricted passage for a delayed return to the normal position and application of full pressure to the clutch chamber after the valve member has returned to the normal position, and means selectively to disconnect said restricted passage from the source of fluid under pressure to hold the valve member in said one direction and hold a reduced pressure in the clutch chamber for shifting the gears of the transmission.

4. In a machine tool having a spindle drive mechanism, the combination comprising a clutch in the drive mechanism having a clutch chamber, said clutch actuated in response to fluid received in the clutch chamber, a source of fluid under pressure, a sump, a clutch chamber pressure regulating valve having an outlet port connected to said clutch chamber and having an inlet port, said valve having a first chamber in communication with the clutch chamber and a second chamber having a restricted passage leading thereto, said valve having a valve member defining a variable resistance to fluid flow between the inlet port and the outlet port and normally held in a predetermined position of low resistance to flow, said valve member shiftable in one direction from said predetermined position in response to pressure in said first chamber to increase the resistance to flow from the inlet port to the outlet port and limit the pressure in the clutch chamber, said valve member shiftable in the opposite direction when fluid under pressure is connected to said restricted passage for a delayed return to said predetermined position and a gradual decrease of resistance to flow from the inlet port to the outlet port, and a control valve hydraulically connected between the source of pressure and the clutch chamber pressure regulating valve operable in one position to connect said inlet port and said restricted passage to the source of fluid under pressure for delayed application of full pressure to the clutch chamber and operable in another position to connect the inlet port to the source of fluid under pressure and to connect said restricted passage to the sump for maintaining a reduced pressure in the clutch chamber.

5. In a machine tool having a spindle drive mechanism including a transmission and a clutch having a clutch chamber, said clutch actuated in response to fluid received in the clutch chamber, mechanism for control of fluid flow to the clutch chamber for effecting a smooth start of the spindle and alternately effecting creep of the transmission for meshing of the gears thereof, said mechanism comprising in combination a source of fluid under pressure, a sump, a clutch chamber pressure regulating valve having an outlet port connected to said clutch chamber and having an inlet port, said valve having a first chamber in communication with the clutch chamber and a second chamber having a restricted passage leading thereto, said valve having a first movable valve member communicating with the first chamber, said valve member defining a variable resistance to fluid flow between the inlet port and the outlet port, said valve having a second movable valve member communicating with the second chamber, said valve having a spring interposed between said valve members to normally hold the first valve member in a predetermined position of low resistance to flow, said first valve member shiftable toward the second valve member and against the bias of the spring in response to pressure in said first chamber to increase the resistance to flow from the inlet port to the outlet port and limit the pressure in the clutch chamber, said second valve member shiftable in the opposite direction when fluid under pressure is connected to said restricted passage for controlled movement of the first valve member in said opposite direction and gradual decrease of resistance to flow from the inlet port to the outlet port, said first valve member returning to its normal position a predetermined time after fluid under pressure is applied to the restricted passage, and a control valve hydraulically connected between the source of pressure and the clutch chamber pressure regulating valve operable in one position to connect said inlet port and said restricted passage to the source of fluid under pressure for delayed application of full pressure to the clutch chamber and operable in another position to connect the inlet port to the source of fluid under pressure and to connect said restricted passage to the sump to maintain a reduce dpressure in the clutch chamber.

6. A drive mechanism for a machine tool comprising in combination a source of fluid under pressure, a prime mover, a transmission, a rotatable shaft connected to the transmission, means to shift the gears of the transmission, a clutch having a clutch chamber, said clutch adapted to effect engagement of said shaft with the prime mover in accordance with pressure in the clutch chamber, said clutch effecting a slipping engagement between the prime mover and the shaft when a reduced pressure is applied to the clutch chamber and effecting a gripping engagement therebetween when full pressure is applied to the clutch chamber, a clutch chamber pressure regulating valve having an inlet port, an operating port, and an outlet port, said outlet port connected to the clutch chamber, said valve operable to apply full pressure to the clutch chamber when the inlet port and operating port are connected to the source of pressure and operable to apply reduced pressure to the clutch chamber when the inlet port is connected to the source of pressure and the operating port is disconnected therefrom, and a control valve operable in one position to connect the inlet port and the operating port to the source of pressure for gripping engagement between the prime mover and the shaft and operable in another position to connect the inlet port to the source of pressure and disconnect the operating port therefrom to effect slipping engagement between the primer mover and the shaft for shifting gears.

7. A spindle drive mechanism for a machine tool comprising in combination a source of fluid under pressure, a sump, a prime mover, a transmission connected to the spindle, a rotatable shaft connected to the transmission, means to shift the gears of the transmission, a clutch having a clutch chamber, said clutch adapted to effect engagement of said shaft with the prime mover in accordance with pressure in the clutch chamber, said clutch effecting a slipping engagement between the prime mover and the shaft when a reduced pressure is applied to the clutch chamber and effecting a gripping engagement therebetween when full pressure is applied to the clutch chamber, a clutch chamber pressure regulating valve having an outlet port and a pressure control chamber both connected to the clutch chamber, said valve having an inlet port and an operating chamber, said valve having a movable pressure control valve member in communication with said pressure control chamber and a movable operating valve member in communication with said operating chamber, said valve members having a spring received therebetween and the operating valve member having a larger area exposed to the operating chamber than the area of the pressure control valve member exposed to the pressure control chamber, said pressure control valve member defining a variable resistance to flow between the inlet port and the outlet port, said pressure control valve member biased in one direction by the spring to a predetermined position offering low resistance to flow and urged in the opposite direction toward the operating valve member to increase resistance to flow in response to pressure in the pressure control chamber, said pressure control valve member shifted back toward said predetermined position against the force exerted by the pressure in said pressure control chamber by movement of the operating valve member in response to an increasing pressure in the operating chamber, a control valve connected to the source of fluid under pressure having a first line connected to the inlet port and a second line having a restriction therein connected to the operating chamber, said control valve having a control valve member shiftable to a first position to connect the source of pressure to both of said lines whereby the clutch chamber fills rapidly and increase of pressure in the clutch chamber is determined by the increase of pressure in the operating chamber, and shiftable to a second position to connect said first line to the source of pressure and to connect said second line to the sump whereby reduced pressure in the clutch chamber is maintained for shifting the gears of the transmission.

8. A drive mechanism for a machine tool comprising in combination a source of fluid under pressure, a prime mover, a transmission having an input shaft and shiftable gears, a clutch having a clutch chamber, said clutch adapted to effect engagement of the prime mover with the input shaft in accordance with pressure in the clutch chamber, said clutch effecting a slipping engagement to drive the transmission input shaft at a creep speed when pressure applied to the clutch chamber is at a reduced level, a clutch chamber pressure regulating valve having an inlet port connectable to the source of fluid under pressure and an outlet port in communication with the clutch chamber, said valve having a pressure control chamber in communication with the outlet port and having a pressure control valve member in communication with said pressure control chamber, said pressure control valve member normally biased to a position to permit free flow of fluid between the inlet port and the outlet port and movable against the bias in response to pressure in the pressure control chamber to throttle the flow between the inlet port and the outlet port to establish and maintain a reduced level of pressure in the clutch chamber, and a control member operable selectively for application of a greater pressure to the clutch chamber to effect a gripping engagement by the clutch between the prime mover and the input shaft.

References Cited in the file of this patent
UNITED STATES PATENTS
2,537,409   Hassman et al. _____ Jan. 9, 1951